United States Patent

Beagles et al.

[11] 3,715,712
[45] Feb. 6, 1973

[54] INTRUSION DETECTION SYSTEM EMPLOYING TRIPLE COINCIDENCE SPACE-TIME LOGIC

[72] Inventor: Robert Beagles, Pacific Palisades, Calif.

[73] Assignee: TRW Inc., Redondo Beach, Calif., a corporation of Ohio

[22] Filed: June 21, 1971

[21] Appl. No.: 154,817

[52] U.S. Cl. ................................ 340/276
[51] Int. Cl. .............................. G08b 25/00
[58] Field of Search ............... 340/258 R, B; 263, 276, 259, 324/70

[56] References cited
UNITED STATES PATENTS

| | | | |
|---|---|---|---|
| 2,649,538 | 8/53 | Marlowe et al. | 340/258 B |
| 3,524,180 | 8/70 | Cruse | 340/258 B |
| 3,629,822 | 12/71 | Johnson | 340/259 |
| 3,270,930 | 9/66 | Emerson | 340/259 |
| 3,576,559 | 4/71 | Gerstenberger | 340/259 |

*Primary Examiner* — John W. Caldwell
*Assistant Examiner* — Marshall M. Curtis
*Attorney* — Daniel T. Anderson

ABSTRACT

First, second, and third sensors are arranged along a path so that the second sensor is equidistant from the first and third sensors. An intruder passing the first sensor causes a signal to be inserted into a shift register and thence to a coincidence gate. When the intruder passes the second sensor, another signal is inserted into a second shift register and thence into the coincidence gate. The stepping rate of the second shift register is twice that of the first shift register. When the intruder passes the third sensor, a third signal is inserted directly into the coincidence gate, and at that time, the second signal will have caught up with the first signal so that all three signals will be coincident. When all three signals are coincident, an alarm is actuated to indicate the presence of the intruder.

4 Claims, 4 Drawing Figures

Robert Beagles
INVENTOR.

INTRUSION DETECTION SYSTEM, EMPLOYING TRIPLE COINCIDENCE SPACE-TIME LOGIC

BACKGROUND OF THE INVENTION

1. Field of the Invention

This invention relates to intrusion detection systems and more particularly to a simplified, low-cost system that will afford a high probability of detection and yet a low probability of false alarms.

2. Description of the Prior Art

One of the unsolved problems in counterinfiltration pertains to achieving reliable detection of intruders without suffering from excessive nuisance or false alarms. A single sensor, regardless of type, is usually not satisfactory for remote use, and it is necessary to resort to multiple sensors and to integrate the sensor outputs in a logical manner. In the cases of some large systems, this integration has been done by using computers to collect signals from many sensors, and employing personnel to monitor correlations and moving patterns on display boards. Obviously, such systems suffer the disadvantages of being complex and requiring the use of highly trained personnel for their operation.

SUMMARY OF THE INVENTION

First, second, and third sensors are spaced along a predetermined path where detection of an intruding object is sought. The second sensor is equidistant from the first and third sensors.

A moving object is first sensed by the first sensor which provides a sensing signal that is coupled to a first shift register for delaying the signal at a given stepping rate that is determined by the slowest expected velocity of the intruding object. The delayed signal is fed to a coincidence gate.

When the moving object reaches the third sensor, another sensing signal is generated thereby and coupled to a second shift register that delays the second sensing signal at a stepping rate that is twice as fast as that of the first shift register. This delayed signal is also fed to the coincidence gate.

When moving object reaches the third sensor, another sensing signal is generated thereby and coupled to the coincidence gate. By this time, the second delayed signal will have caught up to the first delayed signal and all three signals from the three sensors will be coincident and contemporaneously applied to the coincidence gate. When all three signals are coincident, an output signal is derived from the coincidence gate and fed to an alarm mechanism to indicate the presence of the intruding object.

DESCRIPTION OF THE PREFERRED EMBODIMENT

Figure 1:
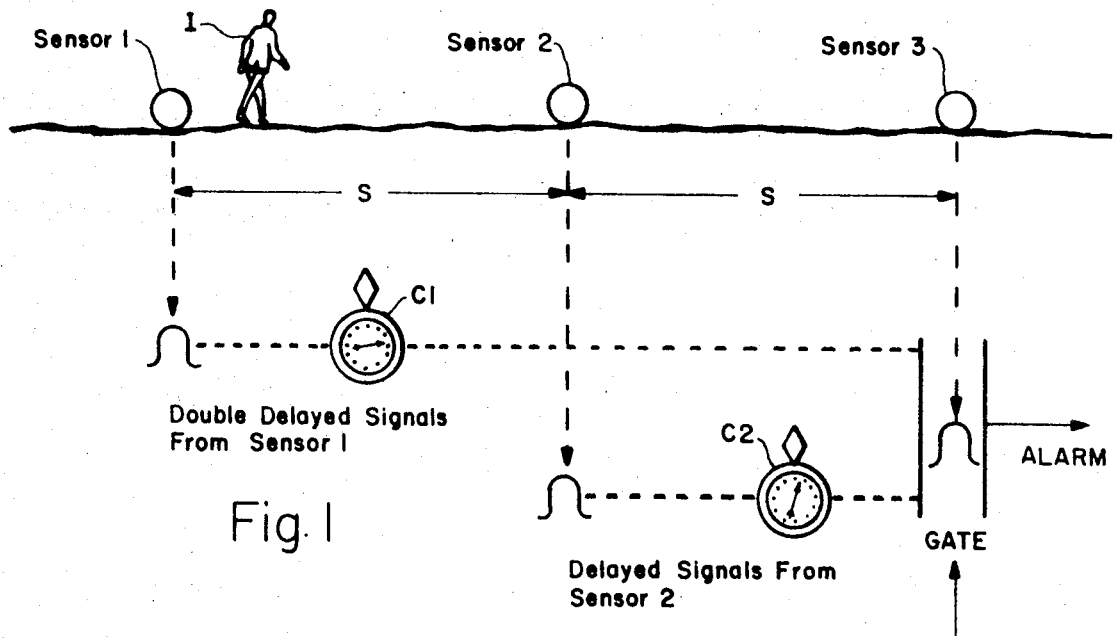
FIG. 1 is a diagrammatic view illustrating the operation of the intrusion detection apparatus of the invention.

Referring now to FIG. 1, there is shown a diagrammatic view illustrating the events taking place as an intruder is detected by the apparatus of the invention. In the illustration, it is assumed that an intruder I is moving at a substantially constant velocity along a path that is planted with three sensors, of which sensor 2 is equally spaced from sensor 1 and sensor 3.

As the intruder passes sensor 1, a signal is generated and delayed by inserting it into a memory delay line such as a shift register. The shift register is designed to have a total delay time equal to the transit time of the intruder I moving from sensor 1 to sensor 3 at the slowest expected velocity. The digital delay provided by the shift register is illustrated by a digital clock C1 that runs at a given constant rate from the time the intruder passes sensor 1 until he reaches sensor 3.

As the intruder passes sensor 2, another signal independent of the first signal is generated and is likewise delayed in a shift register. The second signal is delayed, but the propagation rate in the second shift register is twice as fast as that of the signal in the first shift register, and the delay is likened to a digital clock C2 running twice as fast as the first clock C1.

Both sensor signals continue to be delayed, with the second lagging the first but closing the gap until the intruder I reaches sensor 3, whereupon a third signal is generated. At this point in time, the second signal will have caught up to the first signal since its delay rate is twice as fast as that of the first signal and therefore it requires one-half the delay time of the first signal for it to get in phase with the first signal. Stated another way, irrespective of the average speed of the intruder within a large range of expected velocities, the signals from sensor 1 are always delayed twice as long as the signals from sensor 2 during the time the intruder moves from sensor 1 to sensor 3.

At the time sensor 3 is actuated, all three signals from the three sensors will be coincident, including the undelayed signal from sensor 3, the delayed signal from sensor 2, and the double delayed signal from sensor 1. This event is sensed by feeding all three sensing signals to a coincident gate that produces an output signal upon coincidence of the three signals and actuates an alarm signifying that the intruder has traversed the path defined by the three sensors.

Figure 2:
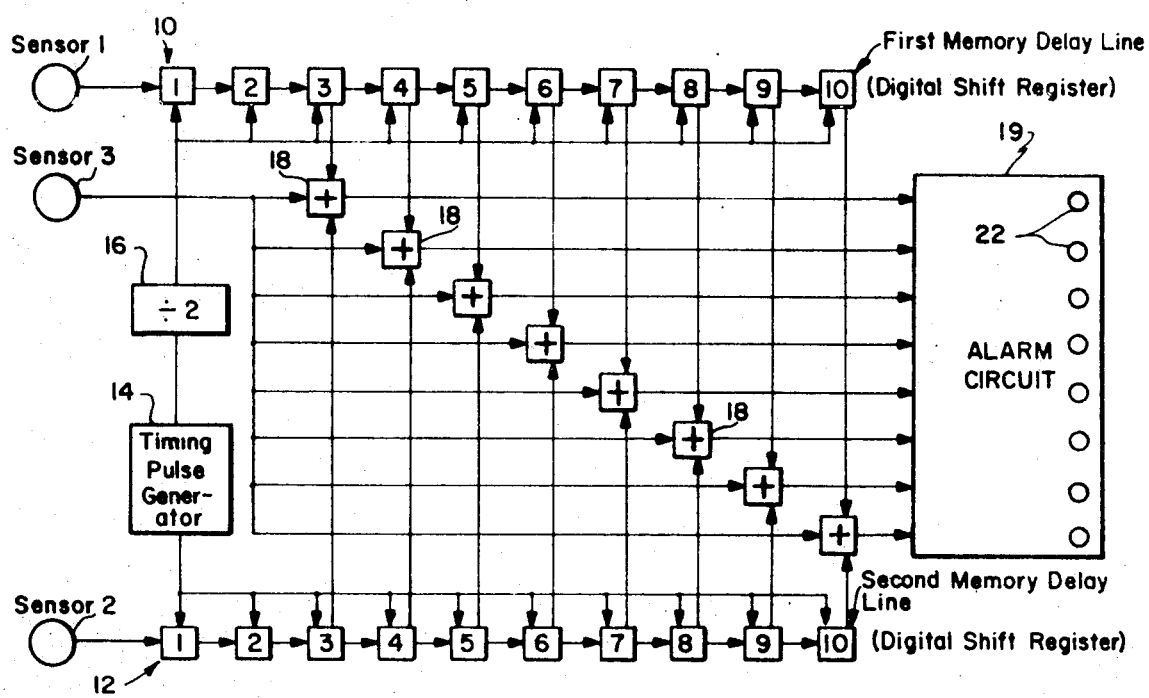
FIG. 2 is a block diagram of one form of the intrusion detection apparatus of the invention.

Referring now to Figure 2, there is shown a block diagram of the intrusion detection system according to the invention. Signals from sensor 1 are fed to a first memory delay line or digital shift register 10 having a multiplicity of stages, of which 10 are shown as illustrative and numbered 1 through 10. Signals from sensor 2 are fed to a second memory delay line or digital shift register 12, also shown as having 10 stages numbered 1 through 10. The digital shift registers 10 and 12 are advanced, stepped, or shifted by means of a timing pulse generator 14.

Since the signal from sensor 1 is to be delayed twice as long as the signal from sensor 2, the stepping rate of the first shift register 10 must be one-half that of the second shift register 12. This is accomplished by feeding the timing pulses from the timing pulse generator 14 to a divider 16 before applying them to the first shift register 10, whereas the timing pulse generator 14 is coupled directly to the second shift register 12. The divider 16 reduces the repetition rate of the timing pulses by a factor of two.

The timing pulses are applied simultaneously to all the stages of the respective shift register. Thus when a signal from sensor 1 is received by the first shift register 10 in stage 1, the timing pulses applied to the shift register 10 will cause the signal to be shifted from stage 1 to all the remaining stages in succession, one step at a time for each timing pulse. Similarly, when a signal from sensor 2 is received by the second shift register 12 in stage 1, the timing pulses applied to the second shift register 12 will cause the signal to be shifted from stage 1 to all the remaining stages, in succession, one stage at a time for each timing pulse.

Although a given intruder moving at constant velocity will set in motion the first signal through the first shift register 10 prior to reception of the second signal by the second shift register 12, and the first signal will have been advanced through (X) number of stages of the first shift register 10 by the time the second signal is initiated and fed into the second shift register 12, both signals will reach the (2X)th stage of their respective shift register at the same time. This is because the second signal is stepped or advanced twice as fast as the first signal. For the slowest expected intruder, both signals will reach the final stages simultaneously. For a faster intruder, they will reach an earlier stage together.

Signals from sensor 3 are fed to a bank of coincidence gates 18, as are signals from the shift registers 10 and 12. The number of coincidence gates is a few less than the number of stages in the shift registers 10 and 12 so that the first few stages of the shift registers 10 and 12 are not coupled thereto. These first few uncoupled stages of the shift registers 10 and 12, which may be termed buffer stages, establish the upper limit on intruder velocity, as will become apparent. A signal from sensor 3 is fed simultaneously in parallel to all the coincidence gates 18 in the bank.

When all three signals from the three sensors coincide in a coincidence gate, the latter is opened and an output signal is derived therefrom. This will normally occur at the time when sensor 3 is actuated and will be an indication that an intruder is present. The output signal from the open coincidence gate is fed to an alarm circuit 19. The alarm circuit 19 may include a bank of lights 22, one for each coincidence gate position. The position of the lit light will be an indication of the velocity. The alarm may also include an audible tone.

It will be observed that triple coincidence will occur at an earlier time or earlier position for a faster intruder than for a slower intruder. The first few stages of the shift registers 10 and 12 are buffered in order to prevent a single area disturbance from causing false alarms by actuating all three sensors momentarily at the same time. Therefore, the number of buffered stages determine the fastest intruder velocity that can be detected, the latter being a function of the delay time between individual stages.

The sensors may be of the seismic type that employ geophones to detect earth vibrations. Alternatively, they may be of the photoelectric eye type employing an infrared light emitting source and an infrared sensitive photoelectric cell. Other suitable well known sensors may be used. The sensors may be coupled to the signal processing apparatus by direct cable, or the sensor signals may be coupled to a radio transmitter for radio transmission of the sensor signals to the signal processing apparatus.

The apparatus may be modified somewhat to accommodate changes in the velocity of the intruder. Briefly this is accomplished by combining the outputs of three adjacent stages of the shift registers 10 and 12 in an "OR" gate prior to insertion in the coincidence gates. This modification is shown if FIG. 3. As illustrated, stages 2, 3 and 4 of the first shift register 10 are coupled to an "OR" gate 20a and the output of the "OR" gate 20a is fed to the first coincidence gate 18 of the bank. Likewise, stages 3, 4, and 5 are coupled to an "OR" gate 20a whose output is fed to the next coincidence gate 18 of the bank, and so on.

In the same manner, stages 2, 3, 4 of the second shift register 12 are coupled to an "OR" gate 20b whose output in turn is fed to the first coincidence gate 18 of the bank. Stages 3, 4, and 5 are coupled to an "OR" gate 20b whose output in turn is fed to the next coincidence gate 18 of the bank, and so on. The signals from the coincidence gates 18 are fed to the alarm circuit 19.

Figure 3:
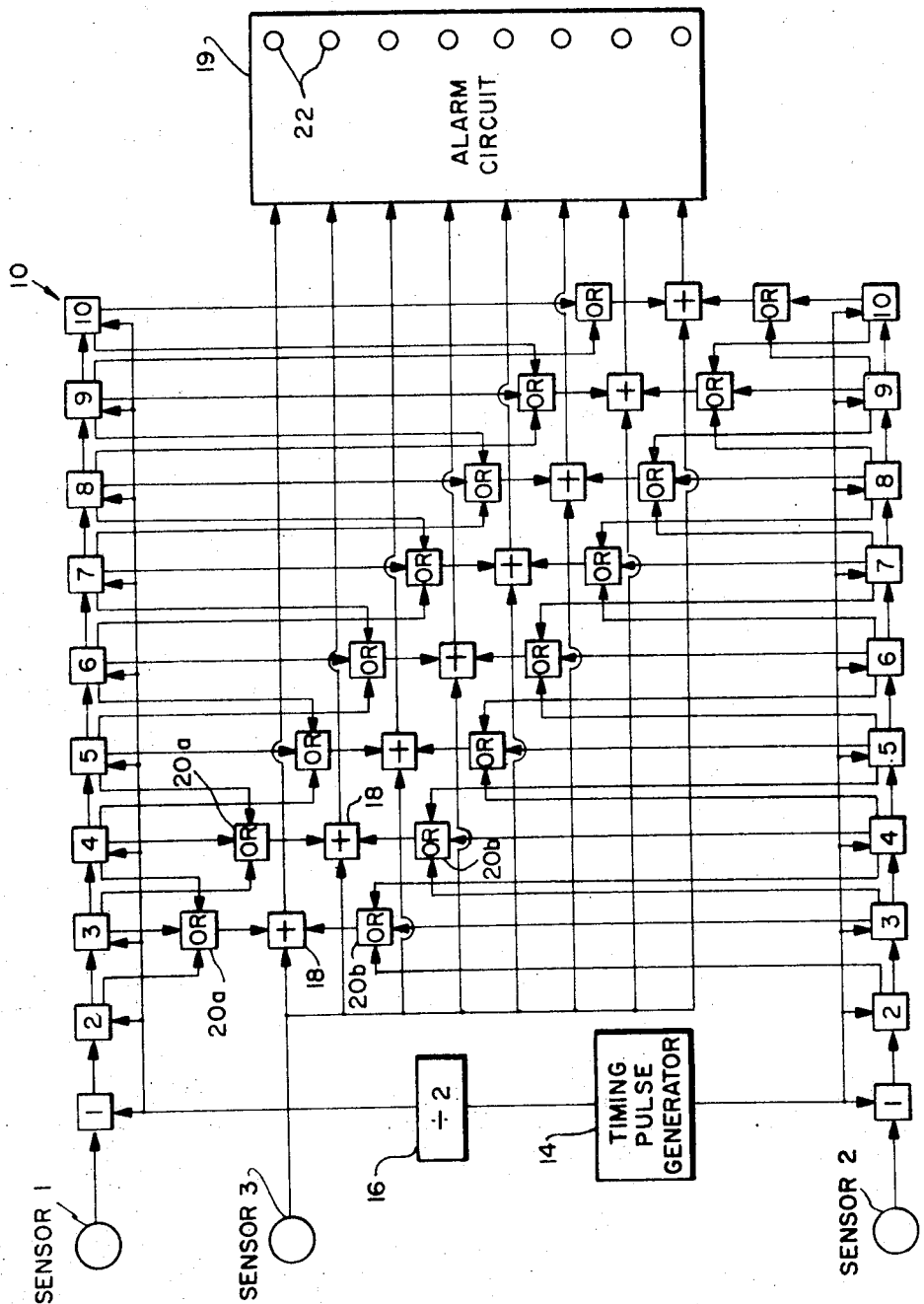
FIG. 3 is a block diagram of another embodiment of the intrusion detection apparatus according to the invention.

To illustrate the operation of the system of FIG. 3, assume that an intruder travels at a predetermined constant velocity such that triple coincidence occurs when the signals have reached stage 6 in both shift registers 10 and 12. Now assume that an intruder travels at an average velocity equal to the predetermined constant velocity but that he speeds up between sensors 1 and 2 and slows down a comparable amount from the average velocity between sensors 2 and 3. The result is that the delayed signal from sensor 1 will be in stage 6 of the first shift register 10 when he reaches sensor 3, as before; however, in this instance, the signal in the second shift register 12 will be in stage 7, since in speeding up between sensors 1 and 2, the intruder will have reached sensor 2 and started the shift register earlier than before. Despite this, triple coincidence is allowed by the "OR" gating logic. The opposite situation of slow-down followed by speed-up may result in stage 6 of the first shift register and stage 5 of the second shift register contributing to the triple coincidence condition. Maximum fluctuations in intruder velocity that fall within the tolerances of the system will result in matching between stages 5 and 7 and stages 7 and 5 of the two shift registers 10 and 12, respectively. The tolerance provision for changes in velocity within the sensor field will also accommodate errors occurring from unequal spacing of the sensors.

If a large number of step positions in the two shift registers are desired, the apparatus may be simplified by replacing the multiplicity of triple coincidence logic circuits or gates by rapid circulation circuits. When a signal from the third sensor is received, the rapid circulation circuits cause all signals to move through a common coincidence logic circuit within a small fraction of the time required for the shift register to take one step when signals are being received. This modification is shown if FIG. 4. As shown therein, signals from sensors 1 and 2 are introduced in the shift registers 10 and 12 in the normal manner, but their outputs are fed to a single coincidence gate 24 and thence to an alarm circuit 26. The shift registers 10 and 12 are controlled by pulses from the slow timing pulse generator 14, the divider 16 being used to reduce by one-half the rate of pulses applied to the first shift register 10, with the appropriate pulses being fed to the respective shift registers through one set of contacts 28a of a switch 30.

A second timing pulse generator that is labeled fast timing pulse generator 32 because it is several orders of magnitude faster than the slow timing pulse generator 14 is connected through another set of contacts 28b of the switch. In this second switch position, both shift registers 10 and 12 receive the same timing pulses from the fast timing pulse generator 32 and in this mode are stepped simultaneously and at a much faster rate than when the switch 30 is in the first position or normal mode. The fast timing pulse generator 32 puts out a series of pulses equal in number to the number of stages in each of the shift registers 10 and 12.

So long as only sensors 1 and 2 are actuated, the switch 30 is in the first position or normal mode as shown, and the operation is the same as that already described in connection with FIGS. 1–3, with the signals from the first two sensors being delayed at different rates in the shift registers 10 and 12. When sensor 3 is actuated, however, the signal therefrom is fed to a relay control circuit 34 that closes a circuit through a relay coil 36 and moves the switch 30 to the lower position. In this position, the slow timing pulse generator 14 is disconnected and the fast timing pulse generator 32 is connected to the shift registers 10 and 12 so as to sweep both sensor signals, which are now coincident, in step through the entire number of stages in the shift registers 10 and 12 and back to their original position. The fast sweep time is only a fraction of the dwell time per step in the faster shift register at normal clock rate.

When the two signals arrive at the last stage of the shift registers 10 and 12, they arrive in step or coincidence and are fed to the coincidence gate 24, which in this case is a double coincidence gate, deriving a signal that is fed to the alarm circuit 26.

At the end of the complete cycle of pulses from the fast timing pulse generator 32, a pulse control circuit 38 coupled between the fast timing pulse generator 32 and the relay control circuit 34 deenergizes the relay coil 36, thereby moving the switch 30 to its original position. The fast timing pulse generator 32 is disconnected and the slow timing pulse generator 14 is reconnected to the shift registers 10 and 12 and all signals in the shift registers would have been returned to the same positions they occupied before sensor 3 was actuated.

Figure 4:
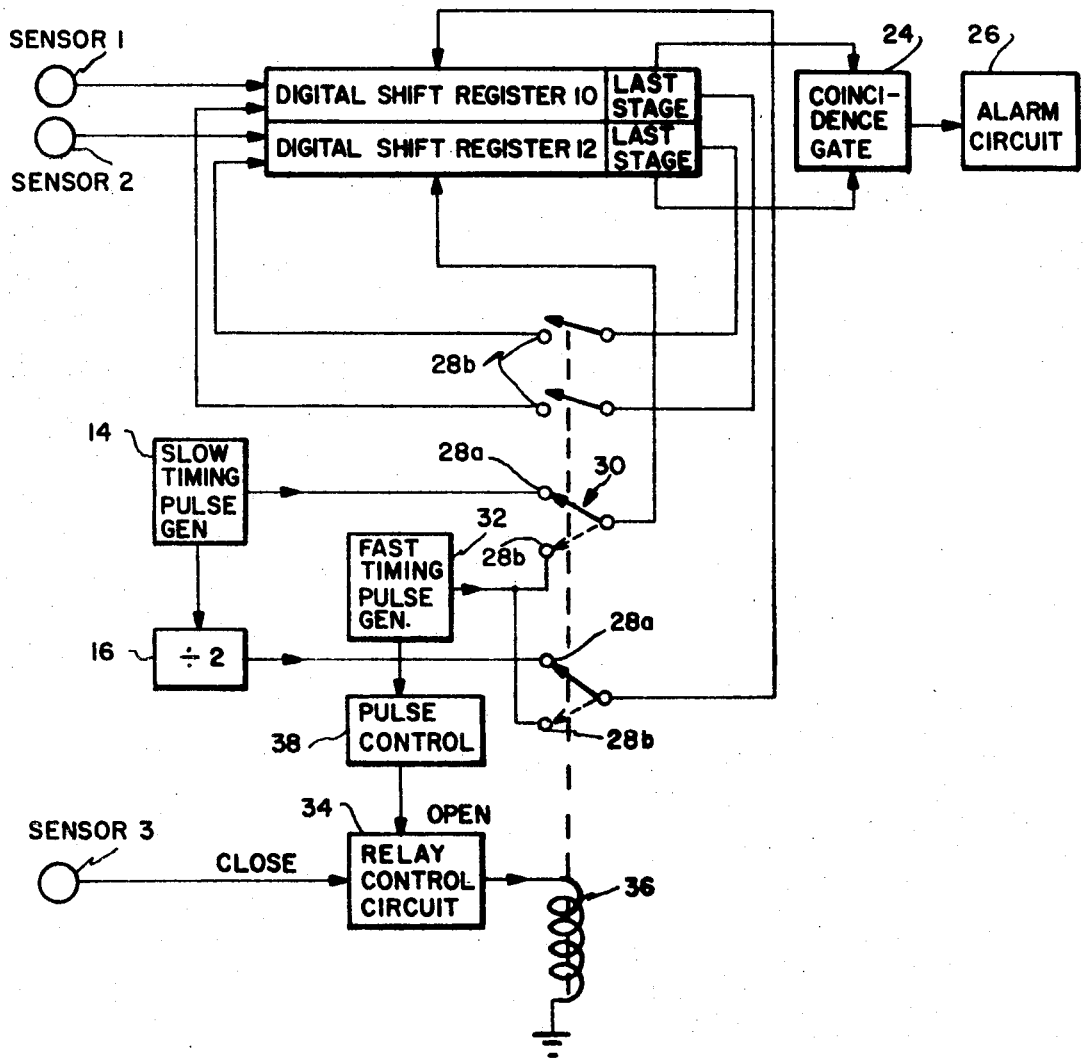
FIG. 4 is a block diagram of yet another embodiment of the intrusion detection apparatus according to the invention.

It will be understood that the apparatus of FIG. 4 may also be modified in the same manner as that of FIG. 3 by employing "OR" gates to accommodate variations in the intruder velocity. It is further understood that the use of relay coil 36 and associated switch elements 30 is illustrative only and their function would preferably be accomplished through the use of solid state electronic circuits.

I Claim:

1. Intrusion detection system, comprising:
   first, second, and third sensors spaced apart along a predetermined path such that the second sensor is substantially equidistant from the first and third sensors, said sensors capable of responding to a moving object to provide an output signal from each one respectively thereof indicative of an object traversing said path;
   a first shift register coupled to said first sensor for receiving a first output signal therefrom and for delaying the same by shifting it at a first stepping rate;
   a second shift register coupled to said second sensor for receiving a second output signal therefrom and for delaying the same by shifting it at a second stepping rate that is twice said first stepping rate;
   a triple coincidence gate coupled to the outputs of said first and second shift registers and to said third sensor for receiving a third output signal from said third sensor and the delayed first and second output signals from said first and second shift registers respectively and for providing a coincidence signal when all three of said output signals are contemporaneously received by said triple coincidence gate; and
   means responsive to said coincidence signal to provide an alarm indicating traversal along said path by an object moving past said first, second and third sensors, respectively, in that order.

2. The invention according to claim 1, wherein corresponding stages of said shift registers are coupled to a coincidence gate to provide said coincidence signal.

3. The invention according to claim 2, and further including an "OR" gate interposed between said coincidence gate and one of said shift registers, with said "OR" gate coupled to at least three consecutive stages of said shift register.

4. The invention according to claim 1, and further including means responsive to the signal from said third sensor for stepping both of said shift registers through a complete cycle at a third stepping rate several orders of magnitude faster than either of said first and second stepping rates and for a period of time less than the dwell time corresponding to each step of said second shift register when the latter is normally operating at said second stepping rate.

* * * * *